United States Patent [19]

Ragály

[11] 4,161,684

[45] Jul. 17, 1979

[54] DUAL VOLTAGE AUTOMOTIVE ON-BOARD ELECTRICAL NETWORK SYSTEM

[75] Inventor: István Ragály, Schwieberdingen, Fed. Rep. of Germany

[73] Assignee: Robert Bosch GmbH, Stuttgart, Fed. Rep. of Germany

[21] Appl. No.: 838,636

[22] Filed: Oct. 3, 1977

[30] Foreign Application Priority Data

Oct. 26, 1976 [DE] Fed. Rep. of Germany ....... 2648372

[51] Int. Cl.² .............................................. H02J 7/14
[52] U.S. Cl. ......................................... 322/90; 320/6; 320/15; 320/57
[58] Field of Search .................... 320/6, 7, 15, 16, 17, 320/61, 57; 322/28, 29, 89, 90, 86

[56] References Cited

U.S. PATENT DOCUMENTS

| | | | |
|---|---|---|---|
| 3,646,422 | 2/1972 | Hankley | 320/15 X |
| 3,763,415 | 10/1973 | Ownby | 320/16 X |
| 3,809,995 | 5/1974 | Hardin | 320/57 X |
| 3,816,805 | 6/1974 | Terry | 320/15 |

Primary Examiner—Robert J. Hickey
Attorney, Agent, or Firm—Frishauf, Holtz, Goodman & Woodward

[57] ABSTRACT

To simplify connection of a starter motor to a 24V supply with a normal on-board network of 12V, an auxiliary rectifier and an auxiliary battery are connected in parallel to the output of an automotive alternator. The starter relay switch contacts are so arranged that, only upon operation of the starter switch, the two batteries are connected in series and then to the starter motor. The supply connections to the batteries are left undisturbed, feedback being prevented by the rectifiers which are connected to the output of the alternator.

12 Claims, 1 Drawing Figure

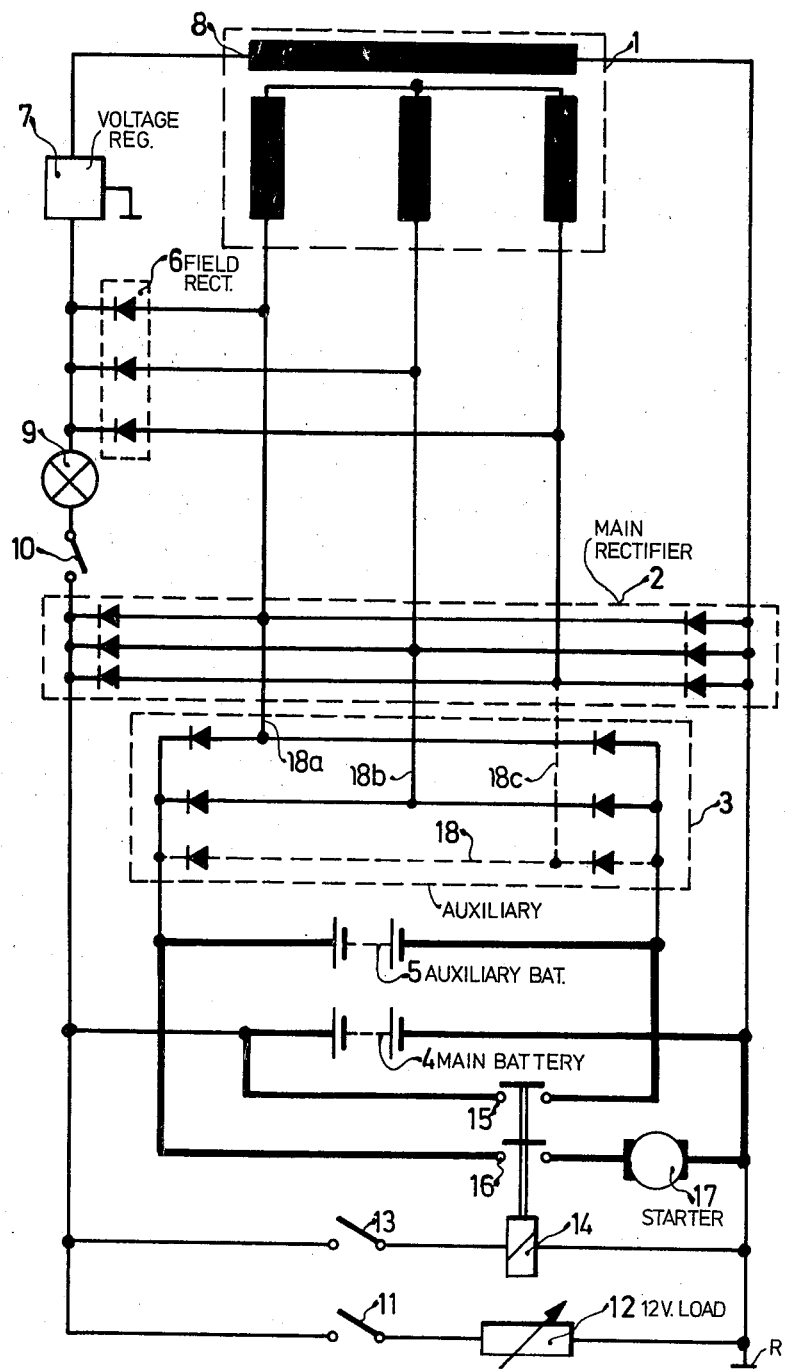

DUAL VOLTAGE AUTOMOTIVE ON-BOARD ELECTRICAL NETWORK SYSTEM

REFERENCE TO RELATED APPLICATIONS

Reference to related applications, assigned to the assignee of the present application:

U.S. Ser. No. 751,438, filed Dec. 16, 1976, Pfeffer et al, now U.S. Pat. No. 4,100,474.

U.S. Application Ser. No. 831,664, filed Sept. 8, 1977 Kofink.

U.S. Application Ser. No. 838,635, filed Oct. 3, 1977 Ragaly.

The present invention relates to a dual voltage supply, and network for automotive vehicles and more particularly to a system in which a normal on-board voltage of 12 V is provided, but an auxiliary battery and circuit is provided on the vehicle to supply the starter motor for the engine thereof.

Background and Prior Art: Various types of multi-voltage level on-board systems have been proposed. Typically, the voltages can be 12 volts and 24 volts. The 12 volt system is used, in well known manner, to supply the usual load encountered in the vehicle such as headlights, signalling lights, radios and the like. The 24 volt system is particularly adapted to supply power to high power loads, such the starter of the vehicle. The high power users require higher operating currents if the battery voltage drops. High currents cause numerous problems, such as heating of electrical supply lines, high resistance contacts or terminals, and the like. Raising the overall on-board voltage for all loads is not necessarily desirable, however, since the lifetime of many loads decreases with increasing voltage—for example incandescent lamps—and problems with insulation arise, particularly in the presence of moisture. To match the voltage level to the various loads for optimum performance, it has previously been proposed to provide multi-voltage circuits in the on-board network of the vehicle. The normal, usually supplied battery supplies the customary and usual and connected loads of the vehicle. The second battery is added only when loads requiring high power are to be connected. The starter is then supplied from both the main battery and an auxiliary battery, connected in series. This sytem has difficulties, however, since switch-over of the batteries is required in dependence on the operating system and network of the vehicle. Separate switch-over circuits are needed in order to permit charging of both batteries by the alternator of the vehicle. Normally, the alternators are designed to provide output power only at a single voltage level. Under ordinary operation of the vehicle, a single battery is sufficient. The second series connected battery which is usually used only upon starting of the vehicle is not loaded or needed in normal operation. As far as the charging circuit of the battery system, then, is concerned, the second battery requires charging at a much lesser level, and with much lesser energy and at a lower power level than charging of the main battery.

The textbook of Kirdorf, "Praxis der Autoelektrik, Vol IV, Page 195, (1970)," describes a circuit in which two batteries are switched by a battery transfer switch. This system has the disadvantage that a high voltage transfer switch is necessary in order to connect the batteries in accordance with the operating mode of the vehicle. Such transfer or change-over switches are subject to malfunction and expensive. It has also been proposed to generate a second, higher voltage from the rectified voltage of an alternator of a vehicle by using a voltage doubling circuit. Such a circuit—known as such—can be used since the additional or auxiliary battery requires only a relatively low charging current. Electronic voltage double circuits have the disadvantage, however, that they require modification of the three phase rectifier used with the alternator and that the circuit is comparatively complex and hence expensive.

The Invention: It is an object to provide a dual voltage network which is simple and capable of using existing equipment, essentially without substantial modification. Particularly, to use an existing alternator thereby permitting particularly efficient manufacture and installation of dual voltage systems without essentially changing manufacturing programs or mass produced components.

Briefly, the main battery is supplied from an alternator through a main rectifier. An auxiliary battery is supplied from the same alternator through an auxiliary rectifier, connected in parallel to the main rectifier. A switch is provided to serially connect the two batteries and the load which requires the higher voltage—typically the starter of an internal combustion engine—when the higher voltage load is to be energized. The inherent rectification characteristics of the rectifiers providing power from the alternator to the batteries prevent application of voltage to the alternator windings.

In a preferred form, the switch is the starter switch of the starter of an automotive type internal combustion engine which, in order to provide for the serial connection of the two batteries, when the starter is to be operated, only requires an additional set of connecting contacts, which is a minor manufacturing modification.

DRAWING: The single FIGURE is a schematic diagram of a dual voltage network in which the starter of an automotive type internal combustion engine is supplied with higher voltage than other loads.

A three-phase alternator 1 has three armature windings which are star connected and a field winding 8. The armature windings are connected, in customary manner, to a main bridge recifier 2 and, in parallel therewith, by means of connection lines 18a, 18b, 18c to an auxiliary bridge rectifier 3 which, in general circuit configuration, is similar to the main rectifier 2. A main battery 4 is connected to the dc output terminals of the main rectifier 2; an auxiliary battery 5 is connected to the dc output terminals of the auxiliary rectifier 3. The armature windings of the alternator 1 are additionally connected a field rectifier 6, the dc output voltage of which is connected to a voltage regulator 7, as well known, to control current flow through the field 8 of the alternator 1 and thus maintain its output voltage at a fixed level. The output terminal of the field rectifier 6 is additionally connected through a charge control indicator 9 and a switch 10 which may be part of the ignition, or main ON-OFF switch of the engine to the positive terminal of the dc output of the bridge rectifier 2. The negative output is connected to a reference, chassis or ground bus schematically indicated by R.

A load 12 can be connected to the output of the main rectifier and across the main battery 4 by closing a switch 11. The load 12, for an automotive vehicle, would be for example a 12 V load such as lights, heater motors, and the like. The 12 V output from the main rectifier can additionally be connected through a starter switch 13 to the coil of a starter relay 14. The starter relay 14 has two switching contacts 15, 16. As is apparent from the FIGURE of the drawing, if switch 13 is closed, starter switch 14 will pull in and close a circuit which places the main battery 4 and auxiliary battery 5 in series and additionally connects a starter 17 in parallel to the series connection of the two batteries, to energize the starter. The starter will then be energized by the combined voltage of both serially connected batteries 4, 5, for example 24 V.

Alternator 1, preferably a three-phase generator for automotive use, supplies, at its output terminals, the main rectifier 2 as well as the auxiliary rectifier 3, the rectifiers 2, 3, being connected in parallel, and which each have their dc outputs connected to the batteries 4, 5, respectively. The output voltage of alternator 1 is controlled by the voltage regulator 7, supplied as well known through field rectifier 6 by controlling current flow through field winding 8. The main battery 4 can be connected by switch 11 to the standard loads in the vehicle which, usually, are loads of comparatively modest power requirement. The variable resistor 12 is used to symbolize the load, the extent of which can change during operation of the vehicle. In this mode of operation, the main battery 4 is charged through the main rectifier 2. The second, or auxiliary battery 5 is charged by the auxiliary rectifier 3. If the second load 17, typically the starter of the engine for the vehicle is to be energized, switch 13 is closed, which energizes relay 14 and causes closing of the connection terminals 15, 16. This places the second load 17 to the series connection of the main battery 4 and the auxiliary battery 5. The negative terminal terminal of the auxiliary battery 5 is not connected to ground or chassis, but, through switch terminal 15 of the starter relay, to the positive terminal of the main battery 4. This mode of operation usually is required only for very short periods of time, so that switch 13 can be opened shortly after having been closed. Upon opening switch 13, relay 14 will drop out and terminals 15, 16 will open to the positions shown in the drawing. This interrupts the circuit of the series connection of the main battery 4 and the auxiliary battery 5 to the load 17. The charge energy required to operate the second load 17, typically the starter, which must be taken from the batteries 4 and 5 can be resupplied by the rectifiers 2, 3. The second battery 5 is used only intermittently and for short periods of time, so that its average loading—over a period of time—is substantially less than that placed on the main battery 4 which, additionally, must supply the normal load 12. Thus, the second or auxiliary rectifiers 3 can use components which are dimensioned to carry much less current than the main rectifier 2, thus can be smaller, require less heat dissipation appliances, or heat sinks, and are less expensive.

The auxiliary rectifier 3 need not be a three-phase full bridge rectifier, as shown. The rectifier brance 18, connected by connecting line 18c can be omitted and is not strictly necessary and, therefore, has been shown in broken lines. The auxiliary battery 5 will then be charged by two-phase rectification.

Feedback of current between the batteries and through the alternator is prevented by the inherent blocking characteristics of the rectifier diodes in the rectifiers 2, 3, which prevent reverse current flow.

The system has the specific advantage that it can utilize existing equipment present in most standard automotive vehicles and requires only minor modification to the ordinary and customarily used wiring and network arrangement. The largest and most expensive element of the system, the alternator, remains unchanged. The connection of the two batteries in series does not require separate switches but can be effected by the already present starter relay which need be modified only by providing an additional contact terminal. This permits particularly simple and economical manufacture of dual voltage systems in automotive vehicles without essentially changing wiring harnesses, wiring networks, or components of the electrical system.

Various changes and modifications may be made within the scope of the inventive concept.

I claim:

1. Dual voltage automotive on-board electrical network system having
   a three-phase alternator (1);
   a main battery (4);
   a main three-phase bridge rectifier (2) connected to the alternator (1) and supplying charging current from the alternator to the main battery;
   an auxiliary battery (5);
   an auxiliary two-phase bridge rectifier (3) supplying charging current from the alternator to the auxiliary battery (5);
   mean (18a, 18b, 18c) connecting the output of the alternator (1) to the input of the main rectifier (2) and to the input of the input of the auxiliary rectifier (3) to supply power from the alternator to both said rectifiers;
   a main load (12);
   main switch means (11) selectively connecting said main load to main battery (4);
   an auxiliary load (17) having a voltage rating which is the sum of the nominal battery voltages of both said batteries (4, 5);
   and auxiliary switch means (13, 14, 16) connected for energization of said auxiliary load (17);
   said auxiliary switch means (13, 14, 16) including a switching connection (15) serially connecting said batteries (4, 5) upon connection of said auxiliary load (17) for energization by said batteries (4, 5) in series.

2. Network according to claim 1, wherein said auxiliary switch means and said switching connection (15) connects said auxiliary load (17) in parallel to the series connection of the main battery (4) and the auxiliary battery (5).

3. Network according to claim 1, wherein the auxiliary rectifier comprises a rectifier arrangement connected to less than the three-phases of the three-phase alternator.

4. Network according to claim 1, wherein the auxiliary switch means has two closing contacts (15, 16), one of the contacts being formed by the switching connection (15);
   the switching connection (15) being connected to the positive terminal of the main battery and to the negative terminal of the auxiliary battery;
   the other terminal (16) of the auxiliary switch means being connected to the positive terminal of the auxiliary battery and to one terminal of the auxiliary load (17), the negative terminal of the main battery (14) and the other terminal of the load (17) being connected together and to a reference bus (R).

5. Network according to claim 1, wherein the auxiliary load comprises a starter motor for an automotive internal combustion engine, and the auxiliary switch means comprises the starter relay for the starter motor (17) of the engine.

6. Network according to claim 1, wherein the auxiliary switch means (13, 14, 16) and said switching connection (15) are operated essentially simultaneously to essentially simultaneously connect, or disconnect said batteries (4, 5) in series, and said auxiliary load (17) across the series connection of said batteries;

and wherein one terminal of the main battery (4) is connected to a chassis, ground or reference bus (R) of the on-board electrical network, the auxiliary battery (5) and the output terminals of the auxiliary rectifier (3) being isolated with respect to the chassis or reference bus (R) to permit said serial connection of said batteries upon closing of said auxiliary switch means and electrical closing of said switching connection (15).

7. Dual voltage automotive on-board electrical network system having a three-phase alternator (1);
a main battery (4);
a main three-phase bridge rectifier (2) connected to the alternator and supplying charging current from the alternator to the main battery;
an auxiliary battery (5);
an auxiliary rectifier (3) supplying charging current from the alternator to the auxiliary battery (5), the auxiliary rectifier having a lesser current carrying capacity, or power rating, than the current carrying capacity, or power rating, of the main rectifier (2);
means (18a, 18b, 18c) connecting the output of the alternator to the input of the main rectifier (2) and to the input of the auxiliary rectifier (3) to supply power from the alternator to said rectifiers (2,3);
a main load (12);
main switch means (11) selectively connecting said main load to main battery (4);
an auxiliary load (17) having a voltage rating which is the sum of the nominal battery voltages of both said batteries (4, 5);
and auxiliary switch means (13, 14, 16) connected for energization of said auxiliary load (17);

said auxiliary switch means (13, 14, 16) including a switching connection (15) serially connecting said batteries (4, 5) upon connection of said auxiliary load (17) for energization by said batteries (4, 5) in series.

8. System according to claim 7, wherein said auxiliary rectifier (3) is a three-phase rectifier.

9. System according to claim 7, wherein said auxiliary rectifier is a two-phase rectifier.

10. System according to claim 7, wherein the auxiliary switch means has two closing contacts (15, 16), one of the contacts being formed by the switching connection (15);

the switching connection (15) being connected to the positive terminal of the main battery and to the negative terminal of the auxiliary battery;

the other terminal (16) of the auxiliary switch means being connected to the positive terminal of the auxiliary battery and to one terminal of the auxiliary load (17), the negative terminal of the main battery (4) and the other terminal of the load (17) being connected together and to a reference bus (R).

11. System according to claim 7, wherein the auxiliary load comprises a starter motor for an automotive internal combustion engine, and the auxiliary switch means comprises the starter relay for the starter motor (17) of the engine.

12. System according to claim 7, wherein the auxiliary switch means (13, 14, 16) and said switching connection (15) are operated essentially simultaneously to essentially simultaneously connect, or disconnect said batteries (4, 5) in series, and said auxiliary load (17) across the series connection of said batteries;

and wherein one terminal of the main battery (4) is connected to a chassis, ground or reference bus (R) of the on-board electrical network, the auxiliary battery (5) and the output terminals of the auxiliary rectifier (3) being isolated with respect to the chassis or reference bus (R) to permit said serial connection of said batteries upon closing of said auxiliary switch means and electrical closing of said switching connection (15).

* * * * *